Oct. 8, 1940.  G. W. HALL  2,217,052
HOOK
Filed Feb. 23, 1938

Inventor
GEORGE W. HALL.
By
Louis V. Lucia
Attorney

Patented Oct. 8, 1940

2,217,052

UNITED STATES PATENT OFFICE 2,217,052

HOOK

George W. Hall, Hartford, Conn.

Application February 23, 1938, Serial No. 192,002

11 Claims. (Cl. 24—236)

This invention relates to that class of hooks, commonly known as snap hooks and such as shown in Patents Nos. 2,001,959 and 2,033,766. Hooks of this type are especially adapted for use in connection with chains, such as antiskid chains for automobiles and, when so used, it is especially desirable to have these hooks so that a chain may be easily attached thereto, or disengaged therefrom, with one hand and without necessitating the use of the thumb for forcing down the retaining member as necessary on common hooks from which it is very difficult to remove the chains, due to the fact that this has to be usually done in cold weather when the operator's hands are cold and the hooks cannot be readily manipulated.

An object of this invention is to provide an improved hook of the class described into which a member, such as a chain link, can be easily snapped and, when desired, disengaged therefrom by a simple transverse motion of the link without necessitating the pressing down of the retaining member with the finger.

A further object of this invention is to provide such a hook in which the retaining member is so formed that it will prevent disengagement of the chain link excepting when the proper method of detaching the said link is used.

A further object is to provide a connecting hook which is extremely simple as well as economical to produce.

Figure 1:
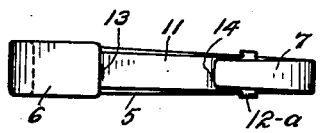
Figure 1 is a plan view, in elevation, of my improved hook.
Figure 2:
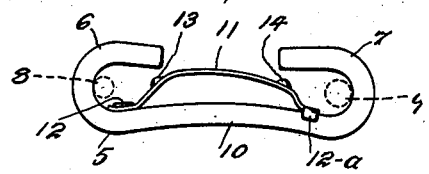
Figure 2 is a side view, in elevation, of the same.

In the embodiment illustrated, the numeral 5 denotes the body of the hook which is preferably of the double type having hooked portions 6 and 7. The hook 6 being of a width to conform substantially to the links of a circumferential chain member, indicated at 8, such as used on automobile tires, and the hook 7 being comparatively narrower to conform with the links 9 of the cross chain. The center of the bar 5 is preferably curved upwardly, as at 10, to conform with the shape of the tire, and a retaining spring member 11 is mounted to the back of the hook by means of a rivet 12 which, if preferred, may be formed integral with the body of the hook. It will be noted that the said retaining spring is anchored, by means of said rivet, to one end of the hook and is bowed upwardly therefrom and extends with its opposite end inside of the hooked portion 7. Tabs 12a are provided at the said opposite end and extend downwardly over the sides of the hook body to prevent lateral displacement of the said retaining spring.

It will also be noted that the said retaining spring is so formed that portions thereof are normally positioned in proximity to the ends of the hooks 6 and 7, and that bosses 13 and 14 are provided on the spring adjacent to the said ends for the purpose to be hereinafter described.

In the operation of my invention, the hook is usually attached to the circumferential chain by passing the end of the said hook through one of the links of said chain and forcing the said link through the space between the end of the hook and the boss 13 on the retaining spring; the said link forcing the said spring downwardly to permit it to pass by the boss and into the hook. When the link is in the hook, it cannot pass out of it unless the retaining spring is first forced downwardly; which can be readily done by pressure on the spring towards the back of the hook.

After the hook is thus attached to the circumferential chain, it is in permanent position and adapted to receive one end of the cross chain of the anti-skid chains in the hooked portion 7. Since such cross chains quickly become broken from wear, and it becomes necessary to replace them in extremely cold weather, it is highly desirable that means be provided for quickly and easily changing the cross chain without necessitating the forcing of the spring 11 downwardly with the finger to permit removal of a link from the hook. Therefore, by means of my invention, the link 9 of the cross chain may be readily snapped into the hook 7 by simply placing it against the end of the hook and pulling it into said hook; at which time the link will engage the boss 14 and force the spring downwardly in passing through the space between the said boss and the end of the hook.

Figure 3:
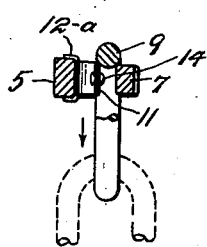
Figure 3 is a view in cross section on line 3—3 of Figure 4
Figure 4:
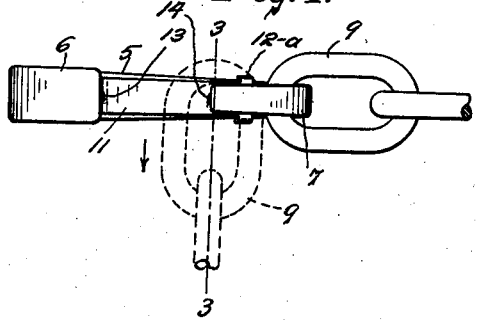
Figure 4 is a view similar to Figure 1, but showing a chain attached to the hook and the position of said chain when it is being detached from the hook.

When it is desired to remove a cross chain which may become broken from wear, the link 9 is turned sidewise over the end of the hook 7, in the position indicated in dotted lines in Figure 4. Then, by simply pulling the said link in the direction indicated by the arrow, it may be readily disengaged from the hook for the reason that the said link will be in the position between the retaining spring and the edge of the hook 7, indicated in Figure 3, and a pull in the direction of the arrow will force the retaining spring away from the end of the hook and permit the link to pass through and over the boss 14. The operation of changing a cross link therefore, becomes so easy that it can be performed without the operator having to remove the gloves from his hands.

Figure 5:
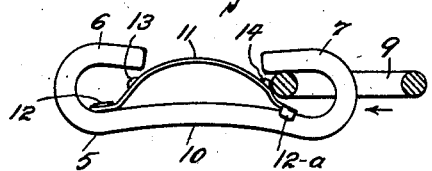
Figure 5 is a view similar to Figure 2 but showing the position of the retaining member when an effort is made to remove the chain link therefrom incorrectly.

If the link 9 should be forced in a direction out of the hook by accident, such as may occur when the cross chains strike an obstacle having a tendency to unhook the link 9, the said link will engage the said boss 14 and force the retaining spring 11 to buckle, as clearly illustrated in Figure 5, and thereby tend to close the opening between the boss 14 and the end of the hook and prevent passage of the link therethrough. This movement of the link 9 which causes the spring 11 to buckle upwardly, will also serve to close, or reduce, the passage between the boss 13 and the end of the hook 6 and thereby serve to eliminate the possibility of the chain or hook becoming accidently disengaged.

If desired, my improved hook may be made with a single hook 7 at one end and with the other end permanently attached to the link 8 of the circumferential chain. The same may also be made from a forging or casting or in any other form which may be preferred for attaining the objects of my invention and without departing from the scope of the following claims.

I claim:

1. A hook of the character described comprising a body having hooks at opposite ends thereof extending towards the center of said body, an inverted U-shaped retaining spring disposed centrally between said hooks and secured with its ends in contact with said body and with the side portions thereof in proximity to the ends of said hooks for retaining members therein.

2. A hook of the character described comprising a body having the opposite ends thereof formed into hooks extending towards the center of said body, an inverted U-shaped spring secured to said body with the side portions thereof disposed in proximity to the ends of said hooks, and bosses projecting from said spring in nearness to the said ends for restricting the passage of a member by the said ends.

3. A device of the character described comprising a body portion having a hook formed at the end thereof, a retaining spring secured to said body by one end and having the opposite end thereof extending into said hook, the said spring being arched on said body to partially close the entrance to said hook for retaining a member therein and means on said spring for causing the same to buckle in a direction away from said body and thereby move towards the said end of the hook upon attempt to disengage the said member therefrom.

4. A device of the character described comprising a body portion having a hook at an end thereof, a retaining spring secured to said body portion at one end and having its opposite end extending into said hook and in engagement with the said body; the said opposite end being curved outwardly into proximity with the free end of said hook for retaining a member therein and means on said spring whereby, upon attempt to detach the said member from said hook, the said opposite end will slide upon the said body and cause the said spring to buckle and thereby prevent disengagement of said member from said hook.

5. A hook of the character described comprising a body portion having hooks at opposite ends thereof extending towards the center of said body, a retaining spring disposed between the ends of said hooks with the central portion thereof spaced from said body, curved portions on said spring whereby the ends thereof are extended in the direction of said body and disposed within said hooks into contact with said body and bosses extending from said spring in proximity to said curved portions and the said free ends of said hooks for retaining a member therein.

6. A hook of the character described comprising a body portion having a hook at each end thereof projecting inwardly towards the center of said body, a retaining spring mounted centrally between said hooks and having end portions diverging into contact with said body, within said hooks, and in proximity to the free ends thereof, and bosses projecting from said spring towards the said free ends for retaining a member within each of said hooks.

7. A hook comprising a body having a hook at one end thereof, a retaining spring spaced from said body and secured thereto at one end; the opposite end of said spring resting on said body in sliding engagement therewith, and tabs at said opposite end extending downwardly therefrom over the sides of said body for preventing lateral movement of said spring relative to said body.

8. A hook of the character described, comprising a body having a hook portion, a retaining spring strip riveted to said body with its ends in contact therewith and curved outwardly therefrom to partly close the entrance into said hook portion, and a protrusion on the surface of said strip adjacent the end of said hook portion for retaining a member in said hook portion.

9. A hook of the character described, comprising a body having a hook portion, a retaining spring strip riveted at one end to said body and curved outwardly therefrom with its opposite end in engagement with said body, a protrusion on the surface of said strip adjacent the end of said hook portion for retaining a member therein, and means on the said opposite end adapted to engage the sides of said body for preventing the displacement of said strip with relation thereto.

10. A device of the character described comprising a body having a hook at one end thereof, a retaining spring secured to said body and having one end extending into said hook and curved to restrict the passage of a member thereinto; the said spring being spaced from the end of said hook to permit entrance of said member into said hook by inserting said member between said end and spring and forcing said spring away from said hook with the movement of said member in a lateral direction between said end and spring, and means on said spring for causing it to buckle in a direction away from said body whereby the same will close the said entrance upon attempt to remove the said member from said hook by movement in a longitudinal direction.

11. A hook of the character described comprising a body having a hook at one end thereof, a retaining spring secured to said body with its ends in contact therewith; the said spring being curved upwardly from said body to partially close the entrance to said hook, and a boss on the surface of said spring spaced from the sides thereof and projecting therefrom in the direction of the free end of said hook.

GEORGE W. HALL.